United States Patent Office 3,639,308
Patented Feb. 1, 1972

3,639,308
TUBELESS TIRE INNER LINER COMPOSITION COMPRISING NATURAL RUBBER, BUTYL RUBBER AND MEDIUM THERMAL BLACK
Barry Topcik, Somerville, N.J., assignor to Cities Service Company, New York, N.Y.
No Drawing. Filed Oct. 8, 1969, Ser. No. 864,888
Int. Cl. C08c 9/10, 9/04
U.S. Cl. 260—5                         12 Claims

ABSTRACT OF THE DISCLOSURE

Compositions for use as an inner liner in pneumatic vehicle tires to reduce the rate at which air escapes from a tire by permeating through the body thereof, comprising from about 50 to about 90 parts by weight of natural rubber, from about 10 to about 50 parts by weight of butyl rubber and from about 40 to about 120 parts by weight of carbon black. At least about 40 parts by weight of the carbon black has a surface area below about 20 m.$^2$/gm. and a dibutylphthalate absorption below about 50.

BACKGROUND OF THE INVENTION

This invention relates to tubeless pneumatic vehicle tires and more particularly to rubber compositions which can be bonded to the inner wall surface of a rubber tire carcass, by vulvanization, to provide a suitable air barrier whereby optimum tire inflation pressures can be maintained for a satisfactory length of time.

The retention of air within inflatable rubber vehicle tires can be accomplished by means of a toroidal balloon, commonly referred to as an "inner tube," which is inserted into the tire before it is mounted onto a wheel and inflated. The tube not only prevents leakage of air between the wheel rim and the tire bead, but it is also constructed of a composition based on a relatively impervious rubber—usually butyl— to prevent excessively rapid loss of inflation pressure by permeation of air through the walls of the tube and tire.

With a tubeless tire the need for an inner tube is eliminated since sealing is effectively accomplished between the wheel rim and the tire bead, to form a pressurizable air chamber, and a relatively impervious liner is bonded to the inner wall of the carcass to reduce permeation loss through the body of the tire. This inner liner is generally required since pneumatic tires are, by and large, constructed of highly unsaturated rubber, such as natural and SBR, and are thus too pervious to maintain desirable inflation pressures for extended lengths of time unless some form of air barrier is used inside the tire.

Three basic characteristics must be present in an inner liner composition before it can be successfully employed in tubeless tires: (1) good air retention qualities, (2) good resistance to heat generated during tire operation, and (3) it must bond tightly to the tire carcass during the vulcanization procedure. Butyl rubber has excellent air retention and heat resistance characteristics but cannot be effectively bonded to the highly unsaturated rubbers of the carcass. Natural and SBR rubbers can be tightly bonded to the kindred rubbers of the caracass but more permeable and less heat resistant than butyl. Previous attempts have used formulations where the amount of NR exceeded the butyl rubber in the inner liner composition. Co-vulcanization of these blends was unsuccessful because of the "curative robbing effect," i.e. the preferential interaction of the curatives with the more highly unsaturated rubber. Thus, the vulcanized compositions consisted of a highly cross-linked unsaturated rubber, in those cases natural rubber, and a substantially non-cross-linked butyl rubber phase. Therefore, inner liner materials based on these blends were characterized by poor physical properties, such as tensile strength and heat resistance, and poor adhesion to tire carcass compositions.

With the development of chlorinated butyl it was discovered that this halogenated rubber could be blended with natural or SBR rubber in wider proportions to provide inner liner compositions having the necessary air retention and heat resistance characteristics. The halogen functionality of the chlorinated butyl rubber provided additional sites for cross-linking thus resulting in increased cure rate and more homogeneous vulcanizates in blends with the more unsaturated rubbers. Inner liners comprising blends of chlorinated butyl and natural or styrene-butadiene rubbers have thus come into wide use, but there has been a continuing search for replacement compositions that have been formulated from rubbers that provide an economic advantage to both the tire builder and the consumer.

SUMMARY OF THE INVENTION

It has now been discovered that blends of butyl rubber with natural rubber and carbon blacks can be utilized to advantage as inner liner material in tubeless tires, provided the amount of butyl rubber in the blend does not exceed the amount of natural rubber and the amount of carbon black is within the range of about 40 to about 120 parts by weight. In accordance with the present invention, homogenous inner liner compositions are provided which can be tightly bonded to highly unsaturated rubbers of the tire carcass to form a vulcanized layer having excellent air retention and heat resistance characteristics.

Generally, the amount of natural rubber in the inner liner composition should be from about 50 to about 90 parst by weight while the butyl rubber should be from about 10 to about 50 parts by weight. To particular advantage, the amount of natural rubber in the blend can be from about 60 to about 80 parts by weight while the amount of butyl rubber is from about 20 to about 40 parts by weight.

While almost any type of carbon black can be employed in forming the inner liner compositions of this invention, especially good results can be obtained with carbon blacks which have a surface area (as determined in the electron microscope) of below about 20 m.$^2$/gm. and a dibutyl phthalate absorption below about 50, since the adhesion of the inner liner to the carcass is maximized when a carbon black is employed which has properties within this range. To particular advantage, medium thermal (MT) black can be used alone or in combination with another carbon black. When used alone, about 60 to about 90 parts by weight represents an optimum amount of medium thermal black that can be employed in the composition.

Conventional curing agents can be mixed into the composition prior to vulcanization and one or more rubber antioxidants can also be included. The unvulcanized compositions can contain, for instance, from 0.75 to about 2.5 phr. (parts per 100 parts of rubber hydrocarbon) of sulfur and from about 0.5 to about 2.0 phr. of a rubber curing accelerator, while also including from about 1 to 4 phr. of a rubber antioxidant.

All of the ingredients of the composition can be compounded in accordance with conventional techniques to produce an unvulcanized stock that is easily process. The finished stock may then be applied to the inner wall of the tire carcass and vulcanized in the usual manner.

DESCRIPTION OF THE PREFERRED EMBODIMENTS

Experiment I

Inner liner compositions were compounded in accordance with the following formulation:

| | Parts by weight |
|---|---|
| Natural rubber | (Varied) |
| Butyl rubber or chlorinated butyl | (Varied) |
| MT carbon black | 60 |
| HAF carbon black | 20 |
| Aminox [1] (antioxidant) | 0.5 |
| Light process oil | 10 |
| Zinc oxide | 5 |
| Stearic acid | 1 |
| Thiazole accelerator (MBTS) | 1 |
| Sulfur | 1 |

[1] Trademark for diphenylamine-acetone reaction product, Uniroyal, Inc., Chemical Division.

The following mixing procedure was employed with above formulation:

Stage I—B Banbury at 180° F.

Additions: Time-minutes
(1) Add polymers and lower ram — 0
(2) Raise ram and add all dry ingredients except curatives and ½ carbon-lower ram — 1
(3) Raise ram and add remaining carbon which has been premixed with oil-lower ram — 2
(4) Raise ram and sweep — 3
(5) Dump — 5

Stage II.—18″ Mill at 180° F.

Additions: Time-minutes
(1) Band batch on mill and add curatives — 0
(2) Refine end over end 4–5 times — 2
(3) Sheet off for stress-strain slabs — 3

Properties of these blends of natural rubber with butyl or chlorinated butyl rubber are shown in Tables I and II. Air permeability for each of the specimens was obtained with the Air Permeability Apparatus of the American Instrument Company, Model 9B305. Strip adhesion tests were performed on 6″ L. x 1″ W. specimens in accordance with ASTM D413–39. High temperature adhesion values were obtained from specimens which had been preheated for 30 minutes at 250° F. and tested at 250° F. in an enclosed Instron apparatus. In preparing the test strips, pads 3″ x 6″ x ¼″ were vulcanized with a ply of inner liner composition against a ply of carcass stock and outer plies of rubberized tire cord.

The pads were then molded for 30 minutes at 320° F. For performing the adhesion tests, two 1″ wide strips were cut from the central portion of the cured slab. The force required to separate the inner liner composition from the carcass stock, in pounds per inch, was measured in an Instron at the rate of 2 inches per minute. The composition of the carcass stock was as follows:

| | Parts by weight |
|---|---|
| Natural rubber | 75 |
| SBR-1502 | 25 |
| Statex G (GPF carbon) | 50 |
| Light process oil | 10 |
| Polymerized trimethyldihydroquinoline | 0.5 |
| Zinc oxide | 5 |
| Stearic acid | 1 |
| N-cyclohexyl-2-benzothiazolesulfenamide | 1 |
| Sulfur | 2 |

TABLE I

| | 1 | 2 | 3 | 4 | 5 |
|---|---|---|---|---|---|
| Natural rubber | 60 | 60 | 70 | 80 | 90 |
| Chlorinated butyl | 40 | | | | |
| Bucar 5000S, butyl | | 40 | 30 | 20 | 10 |
| Stress-strain-cured 45′ at 293° F.: | | | | | |
| L-300, p.s.i. | 730 | 800 | 820 | 940 | 970 |
| Tensile, p.s.i. | 1,530 | 1,500 | 1,800 | 1,980 | 2,340 |
| Elongation | 510 | 480 | 540 | 530 | 580 |
| Shore hardness | 45 | 45 | 44 | 43 | 44 |
| Air permeability room temperature: | | | | | |
| Ft.³/.001″/p.s.i./ft.²/day)×10⁻³ | 2.72 | 2.72 | 3.06 | 3.71 | 4.0 |
| Crescent tear, lbs./in. | 260 | 250 | 336 | 298 | 349 |
| Strip adhesion to 75 NR/25 SBR carcass, pounds/inch at— | | | | | |
| Room temperature | 115 | 45 | 92 | 135 | 200 |
| 250° F. | 50 | | 41 | | |
| Percent retained adhesion | 41 | | 44 | | |

TABLE II

Rheometer cure study at 320° F.

| | 1 | 2 | 3 | 4 | 5 |
|---|---|---|---|---|---|
| Natural rubber | 60 | 60 | 70 | 80 | 90 |
| Chlorinated butyl | 40 | | | | |
| Bucar 5000S, butyl | | 40 | 30 | 20 | 10 |
| Scorch, minutes: | | | | | |
| Time to 1# rise | 2.9 | 3.1 | 3.2 | 2.6 | 2.5 |
| Time to 7# rise | 4.7 | 4.6 | 4.9 | 4.1 | 4.1 |
| Cure rate (in.-lbs./in.) | 4.0 | 4.0 | 4.2 | 4.9 | 5.2 |
| Optimum cure, minutes | 21.2 | 11.0 | 10.7 | 9.8 | 10.0 |

From Table I it can be seen that the inner liner compositions produced from blends of natural rubber and butyl rubber had stress-strain properties which were equal to or better than the inner liner composition produced from natural rubber and chlorinated butyl rubber. It can also be seen that air permeability of the compositions increased and that the adhesion thereof increased as the amount of butyl rubber in the blend was decreased. With a 60/40 blend of natural to butyl rubber, imperviousness to air was as good as the chlorinated butyl-natural rubber blend. While the adhesion strength of the 60 natural/40 butyl blend was not as great as with chlorinated butyl, it should be pointed out that equivalent performance in this characteristic is not essential since much lower adhesion, e.g., 40 pounds per inch, is acceptable in some instances. It will be noted that where performance which is more equivalent to the natural/chlorinated butyl blend is desired, a 70/30 blend of natural rubber with butyl rubber can be employed. Where somewhat higher permeability can be tolerated, 80 or 90 parts of natural rubber can be blended with 20 or 10 parts, respectively, of butyl rubber to achieve adhesion levels which are even higher than those obtained with a conventional 60/40 blend of natural rubber with chlorobutyl rubber. (With this particular formulation the air permeability of natural rubber alone would be well in excess of 5.0.) Thus, the proportion of natural to butyl rubber which is actually employed in the blend will be dictated by the amount of permeability which can be tolerated and the strength of adhesion to the carcass that is required in any particular tire.

A significant observation that can be made from Table II is that compositions of the present invention will reach a state of cure in a significantly faster period of time than the 60/40 blend of natural and chlorobutyl, without any adverse tendency toward scorch.

Experiment II

As previously indicated, there is particular advantage in using a carbon black having an EM surface area below about 20 m.²/gm. and a dibutylphthalate absorption below about 50 when preparing the inner liner compositions of the present invention. A carbon black having such properties is medium thermal (MT) black.

Eight inner liner compositions were prepared according to the following formulation:

|  | Parts (by weight) | | | | | | | |
| --- | --- | --- | --- | --- | --- | --- | --- | --- |
|  | 1 | 2 | 3 | 4 | 5 | 6 | 7 | 8 |
| Natural rubber | 60 | 60 | 60 | 70 | 70 | 70 | 70 | 70 |
| Chlorinated butyl rubber | 40 | 40 | | | | | | |
| Butyl rubber | | | 40 | 30 | 30 | 30 | 30 | 30 |
| HAF carbon black | 20 | | | | 40 | | | |
| MT carbon black | 60 | 80 | 80 | 80 | 40 | 40 | 40 | 40 |
| SRF carbon black, nonstaining | | | | | | 40 | | |
| GPF carbon black | | | | | | | 40 | |
| SRF carbon black (high structure) | | | | | | | | 40 |
| Aminox | 1 | 1 | 1 | 1 | 1 | 1 | 1 | 1 |
| Zinc oxide | 5 | 5 | 5 | 5 | 5 | 5 | 5 | 5 |
| Stearic acid | 1 | 1 | 1 | 1 | 1 | 1 | 1 | 1 |
| Light processing oil | 10 | 10 | 10 | 10 | 10 | 10 | 10 | 10 |
| Benzothiazyl disulfide | 1 | 1 | 1 | 1 | 1 | 1 | 1 | 1 |
| Sulfur | 1 | 1 | 1 | 1 | 1 | 1 | 1 | 1 |

Stress-strain and strip adhesion of the compositions are shown in Table III. Strip adhesion tests were carried out as described in Experiment I using carcass stocks having the same formulation except that 2,2′-methylene-bis (4-methyl - 6 - tertiary-butyl phenol) was used as the antioxidant and 1.25 parts by weight of n-cyclohexyl-2-benzothiazolsulfenaminde was employed as the accelerator instead of only one part.

EM surface area and dibutylphthalate absorption for each of the carbon blacks was as follows:

|  | EM surface area, M.$^2$/gm.[1] | DBP [2] |
| --- | --- | --- |
| Carbon black: | | |
| HAF | 101 | 98 |
| GPF | 47 | 92 |
| SRF-LM | 38 | 68 |
| SRF-HS | 44 | 108 |
| MT | 12 | 35 |

[1] Calculated from surface average particle diameter as determined by electron microscope, "The Particle Size and Shape of Colloidal Carbon as Revealed by Electron Microscope", Columbian Colloidal Carbon, Vol. II, 1940.
[2] ASTM tentative test specification D2414, Report of Committee on Carbon Black, June, 1965.

By reference to Table III it can be seen that in the 70/30 blends of natural rubber and butyl rubber the strongest adhesive bond to the carcass stock developed when 80 parts of MT carbon black was the sole filler employed in the composition, the strength being considerably higher than when blends of MT black with other types of black were used. On the other hand, it is particularly noteworthy that 80 parts of MT black in the 60/40 blend of natural and chlorobutyl rubbers resulted in a lowering of the adhesion strength in comparison to that obtained with 60 parts of MT black in combination with 20 parts of HAF. However, Specimen 3 of Table III should also be compared to Specimen 2 of Table I, since it can be seen that use of 80 parts of MT with the 60/40 blend of natural and butyl rubber resulted in an increase of the adhesion strength to 67 pounds per inch from 45 pounds per inch.

With further reference to Table III, it can be seen that the type of separation obtained in the strip adhesion tests was highly desirable in each case, i.e., separation was in the inner liner and characterized by stock rupture and tearing, rather than at the carcass-inner liner interface. This indicates that the bond between the inner liner composition and the carcass rubber, or the tire cord, was stronger than the inner liner composition itself, a very desirable type of bond. In Specimen #8, there was some interfacial separation and some indication of lower cohesiveness within the inner liner composition, and this can be attributed to the inclusion of 40 parts of SRF-HS carbon black. This particular carbon has a surface area and DBP absorption which are significantly outside of the most preferable limits of below and 20 m.$^2$/gm. surface area and a DBP value of below about 50.

TABLE III

|  | 1 | 2 | 3 | 4 | 5 | 6 | 7 | 8 |
| --- | --- | --- | --- | --- | --- | --- | --- | --- |
| Natural rubber | 60 | 60 | 60 | 70 | 70 | 70 | 70 | 70 |
| Chlorinated butyl rubber | 40 | 40 | | | | | | |
| Butyl rubber | | | 40 | 30 | 30 | 30 | 30 | 30 |
| HAF carbon black | 20 | | | | 40 | | | |
| Carbon black (medium thermal) | 60 | 80 | 80 | 80 | 40 | 40 | 40 | 40 |
| SRF-LM carbon black | | | | | | 40 | | |
| GPF carbon black | | | | | | | 40 | |
| SRF-HS carbon black | | | | | | | | 40 |
| *Rubber properties (Cured at 293° F.)* | | | | | | | | |
| 5′ L-300 | 480 | 240 | 40 | 250 | 850 | 520 | 800 | 870 |
| 5′ tensile | 1,300 | 900 | 770 | 1,010 | 1,880 | 1,330 | 1,680 | 1,600 |
| 45′ L-300 | 740 | 420 | 380 | 420 | 1,190 | 820 | 1,050 | 1,100 |
| 45′ tensile | 1,480 | 1,300 | 1,280 | 1,780 | 1,870 | 1,700 | 1,730 | 1,600 |
| 45′ elongation | 550 | 640 | 640 | 670 | 430 | 550 | 490 | 450 |
| 45′ S. H. | 49 | 42 | 39 | 42 | 55 | 50 | 53 | 54 |
| 60′ tensile | 1,490 | 1,340 | 1,190 | 1,700 | 1,840 | 1,510 | 1,700 | 1,600 |
| Max. tensile | 1,500 | 1,490 | 1,280 | 1,780 | 2,000 | 1,710 | 1,740 | 1,700 |
| Strip adhesion to 75/NR/25 SBR carcass (30′ at 320° F.): | | | | | | | | |
| Pounds/inch | 130 | 117 | 67 | 92 | 73 | 84 | 74 | 70 |
| Type of separation [1] | E | E | E | E | E | E | E | E |

[1] Type of separation.—A = Carcass-Inner liner interface; B = In inner liner-smooth; C = In carcass; D = At tire cord skim stock-liner interface; E = In inner liner-rupture and tearing.

The inner liner compositions of the present invention can be cured with sulfur and an accelerator in accordance with conventional practice. An antioxidant must also be included when the inner liner composition must have improved resistance to heat developed during operation of the tire. Choice of the accelerator will depend upon a balance of original and aged stress-strain properties and the bond strength which are required for the vulcanized inner liner composition.

Various accelerators and antioxidants can be employed in the practice of the invention, but benzothiazyl disulfide (MBTS) and diphenyl amine-acetone reaction product (Aminox®) can be used as the accelerator and the antioxidant, respectively, to obtain the previously mentioned required balance of original and aged stress-strain properties and bond strength.

Experiment III

Three specimens were prepared according to the following formulations:

|  | Parts by weight | | |
| --- | --- | --- | --- |
|  | A | B | C |
| Natural rubber | 60 | 60 | 70 |
| Chlorinated butyl rubber | 40 | 40 | |
| Butyl rubber | | | 30 |
| HAF carbon black | 20 | | |
| MT carbon black | 60 | 80 | 80 |
| Zinc oxide | 5 | 5 | 5 |
| Light processing oil | 10 | 10 | 10 |
| Antioxidant 2246 | 1 | 1 | |
| MBTS | 1 | 1 | 1 |
| Sulfur | 1 | 1 | 0.5 |
| Aminox | | | 1 |

TABLE IV

|  | A | B | C |
|---|---|---|---|
| Natural rubber | 60 | 60 | 70 |
| Chlorinated butyl rubber | 40 | 40 |  |
| Butyl rubber |  |  | 30 |
| HAF black | 20 |  |  |
| MT black | 60 | 80 | 80 |
| MBTS | 1 | 1 | 1 |
| Sulfur | 1 | 1 | 0.5 |

| Rubber properties cured at 293° F. | A | B | C |
|---|---|---|---|
| L45′ L300 | 800 | 430 | 400 |
| 45′ tensile | 1,610 | 1,500 | 1,700 |
| 45′ elongation | 570 | 690 | 680 |
| 45′ S.H. | 45 | 39 | 36 |
| 60′ tensile | 1,650 | 1,500 | 1,740 |
| Maximum tensile | 1,650 | 1,540 | 1,850 |
| Strip adhesion to 75-NR/25 SBR carcass compound, pounds/inch (30′ at 320° F.): |  |  |  |
|   At room temp | 123 | 117 | 105 |
|   Type of separation [1] | ABD | AB | ABD |
|   At 250° F. | 21 | 64 | 70 |
|   Type of separation [1] | A | BD | ABD |
| Aged 96 hrs. at 212° F. (45′ cure): |  |  |  |
|   L-300 | 980 | 520 | 550 |
|   Tensile | 1,200 | 1,030 | 1,450 |
|   Elongation | 380 | 570 | 600 |
|   S.H. | 44 | 35 | 36 |
|   Percent tensile retained | 74.5 | 68.5 | 85 |
|   Percent elongation retained | 67 | 83 | 88 |
| Aged 96 hrs. at 250° F. (45′ cure): |  |  |  |
|   L-300 |  | 800 | 420 |
|   Tensile | 800 | 800 | 820 |
|   Elongation | 170 | 300 | 500 |
|   S.H. | 55 | 44 | 34 |
|   Percent tensile retained | 49.5 | 52 | 48 |
|   Percent elongation retained | 30 | 43.5 | 73.5 |
|   Hardness change | +10 | +5 | −2 |

| Rheometer cure study at 320° F. | A | B | C |
|---|---|---|---|
| Viscosity: |  |  |  |
|   Initial (in.-lb.) | 6.4 | 4.3 | 6.7 |
|   Minimum | 4.4 | 3.2 | 4.6 |
| Scorch: |  |  |  |
|   Time to 1# rise | 1.8 | 2.2 | 2.6 |
|   Time to 7# rise | 3.3 | 3.8 | 4.8 |
| Cure rate, in.-lb./min | 2.6 | 2.4 | 1.9 |
| Max. torque | 31.6 | 26.7 | 24.6 |
| Opt. cure (min.) | 12.3 | 11.2 | 8.3 |

[1] Type of separation.—A=Carcass-inner liner interface; B=In inner liner compound; C=In carcass; D=At tire cord skim-liner interface.

Stress-strain properties, strip adhesion, aging resistance, and Rheometer properties of the specimens are shown in Table IV. Carcass stocks and test strips were produced in accordance with Experiment I. It is noteworthy that Specimen C had a room temperature adhesion strength which approached that of Specimens A and B. More important, Specimen C had an adhesion strength greater at 250° F. than the natural/chlorinated butyl specimens, which is more, indicative of what might be expected in a tire when operating at elevated temperatures. It can also be seen from Table IV that Specimen C demonstrated high retention of tensile and elongation, both at 212° F. and 250° F., after the aging tests.

Experiment IV

In order to demonstrate stress-strain and air permeability characteristics of compositions of the present invention in comparison to similar compositions which contain only natural or butyl rubber, specimens were prepared according to the following formulation:

| | Parts by weight | | | |
|---|---|---|---|---|
|  | A | B | C | D |
| Natural rubber | 100 | 70 | 50 |  |
| Butyl rubber |  | 30 | 50 | 100 |
| Methyl tuads [1] | 1 | 1 | 1 | 1 |
| MT Carbon black | 80 | 80 | 80 | 80 |
| Aminox | 1 | 1 | 1 | 1 |
| Zinc oxide | 5 | 5 | 5 | 5 |
| Stearic acid | 1 | 1 | 1 | 1 |
| Light processing oil | 10 | 10 | 10 | 10 |
| Altax | 1 | 1 | 1 | 1 |
| Sulfur | 1 | 1 | 1 | 1 |

[1] Tetramethyl thiuram disulfide, R. T. Vanderbilt Co.

Stress-strain properties and air permeability of the vulcanized specimens are shown in Table V.

TABLE V

| | Rubber properties (cured at 293° F.) | | | |
|---|---|---|---|---|
|  | A | B | C | D |
| 45′ L-300 | 540 | 410 | 320 | 270 |
| 45′ tensile | 2,900 | 1,740 | 900 | 610 |
| 45′ elongation | 700 | 670 | 650 | 610 |
| 45′ S.H. | 43 | 41 | 39 | 50 |
| 60′ tensile | 2,990 | 1,750 | 820 | 480 |
| Max. tensile | 3,000 | 1,780 | 980 | 1,290 |
| Air permeability (room temperature), ft. $^3$/.001″/p.s.i./ft. $^2$/day ×10 $^3$ | 5.2 | 2.7 | 1.24 | 0.4 |

The present invention has been generally described with reference to "butyl rubber," and it will be understood that the term as used herein is intended to mean any type of commercial grade of butyl rubber currently available, irrespective of molecular weight and/or isobutylene content. Furthermore, the term "butyl rubber" as used in the claims does not include chlorinated butyl rubber.

Therefore, what is claimed is:

1. The combination with a pneumatic tire having a carcass produced from a highly unsaturated rubber of a vulcanized inner liner bonded to the inside wall of said carcass for retaining air inside the tire, said liner comprising from about 50 to about 90 parts by weight of natural rubber, from about 10 to about 50 parts by weight of butyl rubber, from about 40 to about 120 parts by weight of carbon black filler, and wherein at least about 40 parts by weight of said carbon black in said liner has a surface area (E.M.) below about 20 m.$^2$/gm. and a dibutylphthalate absorption of below about 50.

2. The combination of claim 1 wherein said carbon black is a medium thermal black.

3. The combination of claim 2 wherein the inner liner comprises from about 60 to about 90 parts by weight of the medium thermal black.

4. The combination of claim 3 wherein the medium thermal black is the sole filler in the inner liner composition.

5. The combination of claim 1 wherein the inner liner comprises from about 60 to about 80 parts by weight of natural rubber and from about 20 to about 40 parts by weight of butyl rubber.

6. The combination of claim 1 wherein the inner liner comprises about 70 parts of natural rubber, about 30 parts of butyl rubber and about 80 parts of medium thermal black.

7. Pneumatic tire inner liner composition comprising from about 50 to about 90 parts by weight of natural rubber, from about 10 to about 50 parts by weight of butyl rubber, from about 40 to about 120 parts by weight of carbon black, and wherein at least about 40 parts by weight of said carbon black in said liner has a surface area below about 20 m.$^2$/gm. and a dibutylphthalate absorption of below about 50.

8. The composition of claim 7 wherein said carbon black is a medium thermal black.

9. The composition of claim 8 comprising from about 60 to about 90 parts by weight of the medium thermal black.

10. The composition of claim 9 wherein the medium thermal black is the sole filler that is incorporated into the composition.

11. The composition of claim 7 comprising about 70 parts by weight of natural rubber, about 30 parts by weight of butyl rubber and about 80 parts by weight of medium thermal carbon black.

12. Vulcanizable composition as in claim 7 and further comprising benzothiazyl disulfide (MBTS) accelerator and a diphenylamine-acetone reaction product sold under the trademark Aminox.®

(References on following page)

References Cited

UNITED STATES PATENTS

| | | | |
|---|---|---|---|
| 2,575,249 | 11/1951 | Connell et al. | 154—139 |
| 2,791,258 | 5/1957 | Peterson et al. | 152—330 |
| 2,979,470 | 4/1961 | Warren | 260—5 |

MURRAY TILLMAN, Primary Examiner

J. SEIBERT, Assistant Examiner

U.S. Cl. X.R.

152—330; 260—79.5